Feb. 17, 1942.  K. MAYBACH  2,273,411
DEVICE FOR REGULATING THE FUEL ADMISSION OF
INTERNAL COMBUSTION ENGINES
Filed Jan. 12, 1940
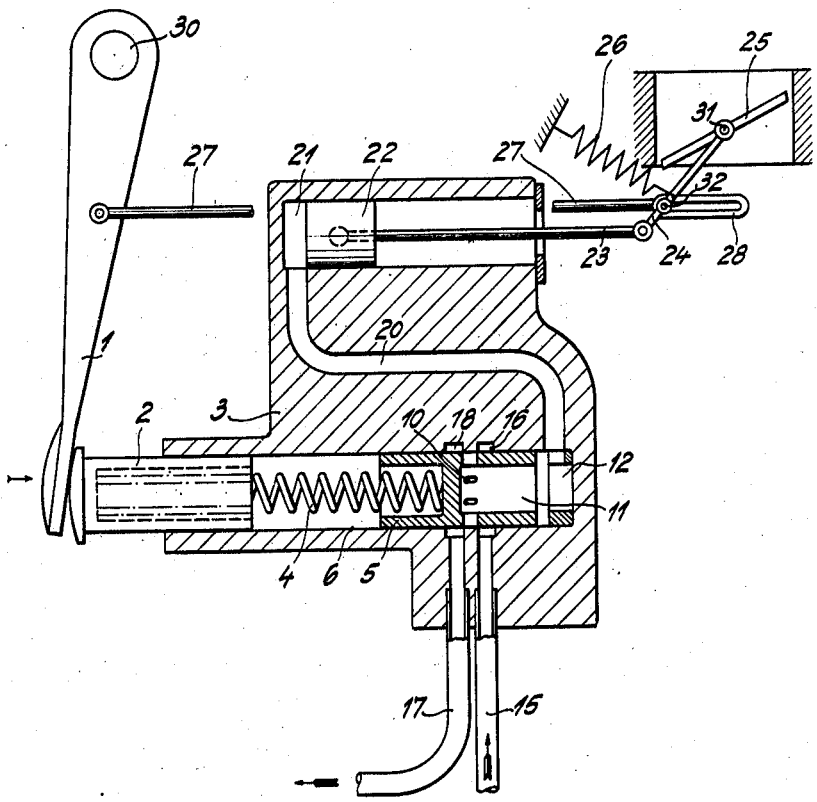
Inventor:
KARL MAYBACH
by Edmund H. Parry Jr.
Attorney Patented Feb. 17, 1942

2,273,411

UNITED STATES PATENT OFFICE 2,273,411

DEVICE FOR REGULATING THE FUEL ADMISSION OF INTERNAL COMBUSTION ENGINES

Karl Maybach, Friedrichshafen, Bodensee, Germany

Application January 12, 1940, Serial No. 313,621
In Germany January 13, 1939

11 Claims. (Cl. 123—103)

My invention relates to devices for regulating the admission of fuel or the mixture of fuel with air in internal combustion engines.

The main object of my invention is safety of the engine and its working against injury in case of the lubricating system being in disorder out of any possible reason. For this purpose I provide means for stopping the engine or for substantially reducing its speed of revolution whenever the pressure of the oil in the lubricating system vanishes or is reduced below a certain predetermined degree.

According to my invention this aim is reached at by providing a liquid pressure transmission system between the hand or foot lever for causing the operation of the fuel regulator, for instance the throttle valve or any corresponding member. The liquid in the pressure transmission system has to be under the pressure prevailing in the lubricating system. Thus, whenever this latter pressure vanishes because of disturbances in the system for instance the transmission becomes inoperative, so that the fuel admission is interrupted and the motor stopped.

I prefer to use the oil of the lubricating system itself as liquid for the transmission whereby the entire device is considerably simplified.

If the motor is used for driving a vehicle then a sudden stop of the engine and also of the car driven thereby may cause disagreeable consequences, especially in cases when there are several cars following each other closely. To prevent such disadvantages I provide a mechanical transmission from the operating lever to the fuel regulator in addition to the liquid pressure transmission, but this mechanical transmission is so limited that it allows for a small fuel admission only which is sufficient to keep the motor running at a low speed and just enough energy to drive the car aside from the road. Both kinds of transmission are connected by means of a lost motion connection or the like.

My invention is of extraordinary value in connection with motor-driven vehicles in which it is impossible for the driver to control the running of the motor by hearing. In case of an oil tube having a leakage or any other circumstance reducing the oil pressure which might lead to destruction of parts of the engine such vanishing of the oil pressure makes the liquid pressure transmission between the operating foot or hand lever and the fuel admission regulator inoperative so that spring means or the like close the fuel valve or throttle thus causing the engine to stop. But by means of the additional mechanical transmission the motor may be kept running at slow speed until the driver has had opportunity of steering the vehicle to the side of the road.

Having given a general description of my invention I now want to point it out more in detail having reference to the drawing which represents examples embodying my invention.

The single figure is a section through a transmission device of the kind described.

Foot lever 1 journaled at 30 is adapted to be moved towards the right, as indicated by the arrow. It presses against member 2 which slides in the housing 3 and partly surrounds spring 4. At its right hand end this spring presses against valve 5 adapted to slide in bore 6. There are openings 10 in valve 5 connecting its inner chamber 11 with the outside and adapted on adequate position of valve 5 to cause connection between chamber 11 and circular space 16 or circular space 18, respectively.

If for the purpose of giving gas lever 1 is pressed to the right it causes member 2, spring 4 and valve 5 to move in the same direction so that openings 10 get into connection with circular space 16. Tube 15 empties into this space and being provided with pressure liquid (as indicated by the arrow) causes pressure liquid to enter chamber 11 and also chamber 12. Thus, by means of bore 20 pressure is exerted on piston 22 from the space 21 at its left so that this piston is moved to the right together with rod 23. The right hand end of rod 23 is connected to lever 24 journaled at 31 and in rotatable connection with throttle valve 25 which is journaled also at 31. Consequently, movement of piston 22 to the right causes opening of throttle valve 25 against the tension of spring 26 which tends to keep valve 25 closed. The pressure of the pressure fluid in chambers 21, 11 and 12 and in bore 20 tends to move valve 5 backwards in the left hand direction, but the pressure exerted by the driver on lever 1, member 2 and spring 4 re-acts thereto, so that in dependence on the position given to member 2 the piston 22 is positioned causing throttle valve 25 to open more or less and to allow admission of fuel or fuel mixture in an adequate degree.

The position of valve 5 is not perfectly motionless even while member 2 is held in its position without movement but the liquid pressure on its right hand side and the spring pressure at its left keep it slightly moving to and fro around its middle position. If it has moved to the right it allows the pressure liquid to enter into spaces 11 and 12 from tube 15 by means of openings 10; thus the increased pressure on the right hand side causes valve 5 to move to the left until the openings 10 allow the pressure fluid on the right hand side of valve 5 to escape again by circular space 18 into tube 17; thereafter spring 4 presses valve 5 back to the right. As by leakage in the spaces 12 and 21 the fluid pressure therein is constantly diminished valve 5 is kept making very small movements to and fro.

As soon as by any reason the pressure of the oil in the lubricating system vanishes so that there is no pressure any more in tube 15 the pressure in chambers 12 and 21 will also disappear so that very soon piston 22 because of spring 26 moves back to its left hand position tending to close throttle valve 25. Lever 1 is still held in its right hand position and because of rod 27 fixed to it at a point not very far from the journaling 30 lever 24 is held in a position in which valve 25 is not perfectly closed so that a certain percentage of fuel is still admitted, enough for keeping the vehicle moving slowly. There is a lost motion connection 28 between rod 27 and pin 32 on lever 24. This connection allows lever 24 to move further to the right than movement of rod 27 would cause, on the other hand it stops valve 25 from closing perfectly as long as lever 1 has not returned to its left hand position.

If the driver observes that in spite of his holding lever 1 in its right hand position the motor and the vehicle reduce their speed considerably he knows that his lubricating system is in disorder and will immediately steer his vehicle to the side of the road to inspect it. Thus material damages are avoided.

I do not want to be limited to the details described or shown in the drawing as many variations may occur to those skilled in the art without deviating from the scope of my invention.

What I claim is:

1. In a device of the kind described in combination hydraulic means for regulating the fuel admission of a motor, mechanical means for the same purpose, and a lost motion connection between said means adapted to allow full admission by said hydraulic means and partial admission only by said mechanical means.

2. A combination device as claimed in claim 1 further including the feature that the fluid for said hydraulic means is in pressure connection with the lubricating system of the motor supplied with said device.

3. A device as claimed in claim 1, said hydraulic means comprising: a valve for regulating fluid pressure, means for operating said valve at will, a piston adapted to be moved by said fluid pressure, a fuel admission valve, and connecting means between said piston and said fuel admission valve.

4. A device of the kind comprising hydraulic means for regulating the fuel admission of a motor, mechanical means for the same purpose, a common lever for operating both said hydraulic and said mechanical means, and a lost motion connection between said means adapted to allow full admission by said hydraulic means and partial admission only by said mechanical means.

5. A device of the kind as claimed in claim 4 further including the feature that the fluid for said hydraulic means is in pressure connection with the lubricating system of the motor supplied with said device.

6. A device as claimed in claim 4, said hydraulic means comprising: a valve for regulating fluid pressure, means for opening said valve at will, a piston adapted to be moved by said fluid pressure, a fuel admission valve, and connecting means between said piston and said fuel admission valve.

7. A device of the kind comprising first means for regulating the fuel admission of a motor, said means being dependent on the pressure prevailing in the lubricating system of said motor, second means also for influencing the fuel admission of said motor but independent of the oil pressure, a common operating lever for both said means, and a lost motion connection between said means, said connection being adapted to allow for said first means to cause full fuel admission to said motor but to allow for said second means to cause partial admission only.

8. A fuel supply control device for internal combustion engines comprising valve means for controlling the supply of fuel, first actuating means for the valve means operative to move the valve means only to partially open position, and second actuating means for the valve means operative to move the valve means to full open position in dependency on the lubricating oil pressure of the engine.

9. A fuel supply control device for internal combustion engines comprising valve means controlling the supply of fuel, mechanical actuating means for the valve means operative to move the valve means only to partially open position, and fluid pressure operated actuating means for the valve means responsive to the lubricating oil pressure of the engine operative to move the valve means to full open position.

10. A fuel supply control device for internal combustion engines comprising valve means for controlling the supply of fuel, first actuating means for the valve means operative to move the valve means to partially open position comprising lost motion means operative to permit further movement of the valve, and second actuating means for the valve means operative to move the valve means to full open position in dependency on the lubricating oil pressure of the engine.

11. A fuel supply control device for internal combustion engines comprising valve means for controlling the supply of fuel, first actuating means for operating the valve means to deliver only a partial supply of fuel, and second actuating means for operating the valve means to deliver the full available supply of fuel, said second actuating means operating in dependency on the lubricating oil pressure of the engine.

KARL MAYBACH.